United States Patent [19]

Haas et al.

[11] 4,076,387
[45] Feb. 28, 1978

[54] MAGNETIC DISPLAY

[75] Inventors: Werner E. L. Haas, Webster; Gary A. Dir, Fairport, both of N.Y.

[73] Assignee: Xerox Corporation, Stamford, Conn.

[21] Appl. No.: 702,270

[22] Filed: Jul. 2, 1976

[51] Int. Cl.² ............................................. G02F 1/36
[52] U.S. Cl. .................................................. 350/362
[58] Field of Search ................ 350/160 R; 340/324 M

[56] References Cited
U.S. PATENT DOCUMENTS

| 3,531,185 | 9/1970 | Buchsbaum et al. | 350/160 R |
| 3,788,729 | 1/1974 | Lowell et al. | 350/160 R |
| 3,876,288 | 4/1975 | Iwata et al. | 350/160 R |

*Primary Examiner*—William L. Sikes
*Attorney, Agent, or Firm*—James J. Ralabate; James P. O'Sullivan; George J. Cannon

[57] ABSTRACT

A magnetic display comprising, between two magnetic field permeable substrates, a ferrofluid and metal flakes, one of the substrates being provided with one or more selectively energizable electro-magnets.

12 Claims, 1 Drawing Figure

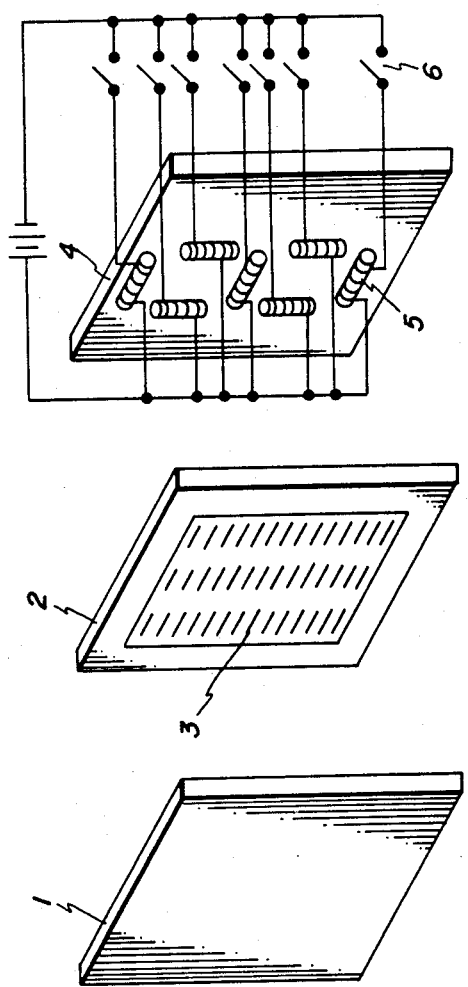

MAGNETIC DISPLAY

BACKGROUND OF THE INVENTION

This invention relates to displays; and, more particularly, to magnetic displays comprising a ferrofluid.

Electro-optic displays are well known. Such displays utilize electric fields, currents and voltages to drive electro-optic media such as liquid crystals; discharge-gases; and, liquid-suspended-needles; flakes and particles. See, for example, U.S. Pat. Nos. 3,674,475 (suspended particle migration display); 3,257,903 (suspended dipole particles) and 3,718,380 (liquid crystal display).

Some activity in magnetic displays has also occurred. See, for example, "A Magnetic-Particles Display", Lawrence L. Lee, IEEE Transactions on Electron Devices, Vol. ED-22, No. 9, September, 1975.

There has also been some activity in which magnetic imaging without toner has been accomplished.

For example, U.S. Pat. No. 3,221,315 to Brown et al. is directed to the utilization of encapsulated ferrofluids in a magnetic recording medium wherein the ferrofluid orientation in the presence of a magnetic field exhibits a variable light-responsive characteristic. In this case, the magnetic recording medium is self-developing in the sense that magnetic marking material need not be employed to present a visible image.

U.S. Pat. No. 3,013,206 to Youngquist et al. discloses a magnetic reader comprising a hollow non-ferromagnetic vessel having a civity field with a suspension of flat, visible, weakly ferromagnetic crystals which orient when suspended in the liquid and in response to a magnetic field.

In new and growing areas of technology, it is sometimes desirable to expand into selectively imagable displays utilizing novel compositions, structure and imaging techniques to provide visible images without hard copy. The present invention is directed to a novel magnetic imaging display.

SUMMARY OF THE INVENTION

It is, therefore, an object of this invention to provide a novel magnetic imaging process.

It is another object of this invention to provide a novel magnetic display.

The foregoing objects and others are accomplished in accordance with this invention by forming a composition comprising a ferrofluid and metal flakes and subjecting the composition to an imagewise configured magnetic field. The composition can be readily fabricated by adding metal flakes such as, for example, aluminum flakes, to a ferrofluid which can be either water based or hydrocarbon based. Optionally, a compatible diluent can be added to comprise up to about 98.5 percent by weight of the resulting composition in some embodiments and these compositions still exhibit satisfactory contrast when subjected to the influence of a magnetic field. The magnetic field is supplied in imagewise configuration by an array of selectively energizable electro-magnets.

BRIEF DESCRIPTION OF THE DRAWING

FIG. 1 is a schematic illustration of a magnetic display according to the present invention.

DETAILED DESCRIPTION OF THE PREFERRED EMBODIMENTS

Referring now to FIG. 1, there is seen a magnetic display provided in accordance with the practice of the present invention. Magnetic imaging composition 3 comprises a ferrofluid and metal flakes. This magnetic imaging composition is retained between optically transparent substrate 1 and substrate 4. Substrates 1 and 4 are made from materials which are permeable to magnetic fields; such as, for example, glass and plastics. Spacer member 2 is optionally used to retain composition 3 in between substrates 1 and 4 in cases where the viscosity of composition 3 is too low and composition 3 cannot be retained between the substrates without the use of the spacer. Spacer 2 is therefore optional and required only in low viscosity embodiments of the present invention. Spacer member 2 can comprise any material, whether transparent or opaque. Member 2 can be colored to provide a border effect for the display.

Magnetic addressing of composition 3 is provided by one or more relatively small electro-magnets 5. Numerical displays can be conveniently provided by the "7-segment" configuration as depicted in FIG. 1. In that configuration, seven active elements are arranged as shown in FIG. 1 so that any number from 0 through 9 can be displayed by selectively activating the appropriate ones of the active elements. In FIG. 1, each active element is a relatively small electromagnet which is selectively activatable by its associated switch. It should be understood, of course, that any array suitable to the information desired to be displayed can be utilized. The array arrangements are conventional and need not be described in detail herein. Suffice to say that an alpha-numeric addressing capability is provided by a five by seven matrix in which a total of 35 active elements are provided in an ordered array of seven rows and five columns. In the present invention, of course, the active elements to be employed in the alpha-numeric array are electromagnets.

As will be discussed in more detail below, composition 3 can comprise a ferrofluid which is either water or hydrocarbon based. Particularly in cases where the ferrofluid to be employed is water based, it is important to utilize insulated wiring in the electromagnets to avoid current flow through the composition which may prove adverse to the magnetic-optical effect sought in the practice of the present invention. The insulation can be conveniently provided by utilizing bare wires in the electromagnets and spraying same with a substantially insulating material such as, for example, a polyurethane resin or an epoxy resin. Also, individually insulated wires can be utilized in the electromagnets.

The electromagnets need not be in contact with the composition 3 nor even on the same side of substrate 4 as composition 3. For example, the electromagnets 5 can be separated from composition 3 by the magnetic field permeable substrate 4. In that case, the insulation of the wiring in the electromagnets is not required so long as electrical shorts are avoided.

"Ferrofluids" as used herein means stable colloidal dispersions of ferri- or ferro-magnetic particles in a liquid medium. The liquid medium can be either water or a hydrocarbon liquid medium. The ferri- or ferromagnetic particles do not flocculate or settle out under the influence of either gravatational or magnetic fields. Ferrofluids behave much like their liquid vehicle in the absence of a magnetic field; however, when a field is applied, the colloidal particles carry their surfactant coating in a substantial solvation sheath along the field gradient. Typically, the surfactant employed is a long-chain organic acid such as oleic acid, linoleic acid; succinic acid derivatives; ECA 3852 manufactured by Exxon Corporation. The particles are less than a critical size to be colloidally stable and in order that the energy of domain wall formation be greater than the energy for rotation of all the spins in the particle.

For a description of ferrofluids, see "Magnetic Fluids" by S. E. Khalafalla in Chem. Tech., page 540, September, 1975; and "Some Applications of Ferrofluid Magnetic Colloids", by Kaiser and Miskolczy *IEEE Transactions on Magnetics,* page 694, volume MAG-6 No. 3, September, 1970.

Generally speaking, magnetic material can exhibit three modes of magnetic behavior depending on particle size. Superparamagnetic behavior, one of the three modes, is exhibited by different materials at particle sizes which vary with the identity of the material. A simplified relationship which allows an approximation for determining the maximum particle diameter at which a given material will exhibit superparamagnetism is given by the equation "Critical volume = $25kT \div K$" where $k$ is Boltzmann's constant ($1.38 \times 10^{-16}$ erg/degree), T is the Kelvin temperature, and K is the magnetic anisotropy in erg/cubic centimeter. This equation is an approximation for spherical union axial particles of equal size. The anisotropy values for K are related to the measureable anisotropy constants $K_1$ and $K_2$ by: $K = K_1/4$ when $K_1$ is greater than 0; and $K = K_1/12 + K_2/27$ when $K_1$ is less than 0. For example, at T = 298° Kelvin, the maximum diameters for superparamagnetic behavior in spherical particles of iron, cobalt, and magnetite are respectively: 250 angstroms, 120 angstroms, and 600 angstroms. For a more thorough discussion of superparamagnitism, see "Superparamagnetism" by C. P. Bean and J. D. Livingston, *J Appl Phys,* supplement to Vol. 30, No. 4, page 1205 (1959).

Typical suitable ferrofluids for use in accordance with the practice of the present invention may be prepared by ball-milling the magnetic particles for periods of about 1,000 hours in the presence of a surfactant as disclosed in "Magnetic Properties of Stable Dispersion of Sub-Domain Magnetite Particles", *J Appl Phys,* Vol. 41, page 1064, by R. Kaiser and G. Miskolczy (1970). Residual coarse material may be centrifuges or allowed to settle out in order to produce a stable ferrofluid by this mechanical milling method. Other methods of preparing ferrofluids include chemical precipitation methods. See, for example, "Preparing Magnetic Fluids by a Peptizing Method", U.S. Bureau of Mines Technical Progress Report 59, G. W. Reimers and S. E. Khalafalla, September, 1972; and U.S. Pat. No. 3,228,881 to Thomas directed to a method of preparing a dispersion of discrete particles of ferromagnetic metals.

Commercially available ferrofluids, such as, for example, ferrofluids exhibiting superparamagnetic behavior can be employed in the practice of the present invention. Such ferrofluids are commercially available from Ferrofluidics Corporation of Burlington, Massachusetts.

Once the superparamagnetic fluid has been prepared, by whatever method, or obtained commercially, metal flakes are added thereto, and, optionally, an appropriate diluent is added. By "appropriate diluent" it is meant that the diluent is compatible with the carrier liquid used in making the ferrofluid; for example, if the ferrofluid is water based, the diluent is water. Similarly, if the ferrofluid is hydrocarbon based, the diluent is a hydrocarbon liquid.

The metal flakes to be added to the ferrofluids can comprise any size flakes which will remain suspended in the ferrofluid and not settle out under conditions of use. In this regard, metal flakes of a size of about 325 mesh or smaller in size than about 325 mesh is preferred. However, larger size flakes can be employed provided they do not settle out of the ferrofluid. Metals of good reflectivity are preferred in the practice of the present invention since it is the reflection of light from the broad surface area of the flakes which provides contrast between magnetic field aligned portions of the composition and non-aligned portions of the composition. In this regard, aluminum flakes availabe from Aluminum Corporation of America have been found to provide excellent results when used in the practice of the present invention. However, any metal flake can be employed which provides an optical characteristic in alignment which is visibly distinguishable from that presented by the flake when viewed on edge or on end.

It has been found that metal flakes suspended in ferrofluids will become aligned in the direction of the magnetic field to which they are subjected and that, furthermore, the alignment is such that predominantly the broad surface area of the metal flake aligns parallel to the magnetic field direction to which the composition is subjected. While the mechanism which accounts for this alignment of the metal flake in a ferrofluid which is subjected to a magnetic field is unknown, it is believed that a guest-host interaction is involved. That is, it is believed that the formation of chains by the magnetic particles in the ferrofluid when subjected to a magnetic field causes the metal flakes suspended in the ferrofluid to align with the chain formation.

While preferred ranges of ferrofluid, diluent and metal flakes are presented in the examples set forth below, it will be appreciated that amounts of components outside these ranges can be employed. For example, in the examples presented below, the magnetic field was varied between 0.5 gauss and 300 gauss. The designation "too thick" and "too thin" in the examples set forth below indicate that satisfactory optical contrast was not achieved with a magnetic field between about 0.5 gauss and about 300 gauss. In the case of a designation "too thick" a magnetic field greater than about 300 gauss should be employed. Where the designation "too thin" appears, it indicates that for the relatively small planer sample tested, the amount of aluminum flakes contained in the sample did not give satisfactory optical contrast. A larger area display should provide results which are suitable to low resolution imaging requirements.

The following examples are set forth to illustrate both preferred embodiments of the present invention and to give guidance to one skilled in the art as to the relative compositional values which are satisfactory for relatively low magnetic field strength imaging; i.e., magnetic field strengths between about 0.5 gauss to about 300 gauss. These examples are given as illustrative but not limiting examples of the present invention. In all cases, unless otherwise noted, the ferrofluids were obtained from Ferrofluidics Corporation of Burlington, Massachusetts and had a magnetic saturation of about 200 gauss; the hydrocargons liquid diluent was SOHIO product 3440 commerically available from Standard Oil Company of Ohio; the metal flakes were aluminum flakes of a size which permits passage through a 325 mesh screen, commerically aviable from Alcoa and parts and percentages are by weight.

EXAMPLE I

A water based composition comprising one part (10%) water based ferrofluid; one part (10%) metal flakes; and, eight parts (80%) water is made by adding the flakes and water to the ferrofluid and stirring to achieve a resulting composition of uniform appearance. The composition is placed between an about four micron thick piece of Mylar film and a glass microscope slide to form a magneto-optic cell. A seven-segment array of electromagnets is provided on the Mylar film to form the array of FIG. 1. The array is sprayed with a polyurethane resin to provide insulation to the wires. The array is energized to provide a magnetic field which is varied between about 0.5 gauss and about 300 gauss.

Prior to being subjected to the magnetic field, the composition appears dark black. Upon being subjected to the field, the metal flakes impart an aluminum appearance to portions of the composition subjected to the magnetic field.

The remaining hydrocarbon based ferrofluid examples are performed in the manner of Example I. The compositional values and results are set forth in Table I, below. *"D" means diluent, *"FF" means ferrofluid and *"MF" means metal flakes. In each example, the result is based on a magnetic field varied between about 0.5 gauss and about 300 gauss.

TABLE I

| EXAMPLE I | Parts *D | Parts *FF | Parts *MF | Result |
|---|---|---|---|---|
| II | 0 | 1 (50%) | 1 (50%) | Too Thick |
| III | 10 (83%) | 1 (8⅓%) | 1 (8⅓%) | O.K. |
| IV | 20 (91%) | 1 (4½%) | 1 (4½%) | O.K. |
| V | 50 (96%) | 1 (2%) | 1 (2%) | O.K. |
| VI | 100 (98%) | 1 (1%) | 1 (1%) | Too Thin |
| VII | 0 | 1 (33%) | 2 (67%) | Too Thick |
| VIII | 20 (87%) | 1 (4⅓%) | 2 (8⅔%) | Too Thick |
| IX | 40 (93%) | 1 (2%) | 2 (5%) | O.K. |
| X | 100 (97%) | 1 (1%) | 2 (2%) | O.K. |
| XI | 200 (98.5%) | 1 (.5%) | 2 (1%) | O.K. |
| XII | 0 | 1 (20%) | 4 (80%) | Too Thick |
| XIII | 10 (67%) | 1 (6.6%) | 4 (26.4%) | Too Thick |
| XIV | 20 (80%) | 1 (4%) | 4 (16%) | Marginally O.K. |
| XV | 50 (91%) | 1 (1.8%) | 4 (7.2%) | O.K. |
| XVI | 100 (95%) | 1 (1%) | 4 (4%) | O.K. |

It is to be noted that the above results were obtained with magnetic fields applied between about 0.5 gauss and about 300 gauss. Accordingly, magnetic fields greater than about 300 gauss would have to be employed or, in the alternative compositional variations beyond Table I would have to be employed to obtain satisfactory optical results. For example, it is noted in Table I that in examples II, VII, and XII, the resulting composition was too thick to provide satisfactory optical characteristics. In these examples, no diluent was added to the ferrofluid-metal flake composition and the ferrofluid was always present in an amount no greater than an equal part by weight of the metal flakes. The thickness of the resulting composition in those three examples can be altered by varying the ratio of ferrofluid to metal flakes such that the ferrofluid is always present in a greater amount by weight than the metal flakes. In this manner, suitable optical response can be obtained for magnetic fields between about 0.5 gauss and about 300 gauss. It is to be noted that as earlier defined, a ferrofluid contains a liquid carrier in which the superparamagnetic particles are colloidally suspended. Accordingly, the addition of greater amounts of ferrofluid relative to metal flakes will inherently dilute the resulting composition. As a matter of preference, the addition of diluent is preferred rather than the use of more ferrofluid simply as a matter of practical economics.

While this invention has been described with respect to particularly preferred embodiments of the display, it will be appreicated by those skilled in the art that the invention is not limited thereto.

For example, for purposes of clarity and understanding of the invention, the array and associated circuitry of the electromagnets has been kept relatively simple. However, more complicated circuitry can be utilized to provide the desired input into the display. For example, the display in FIG. 1 can be prepared with pins, two pins for each electromagnet, and the display can therefore be plugged into any circuitry such as, for example, an electronic digital clock circuit; an electronic keyboard circuit; an electronic thermometer circuit; an electronic wind speed indication circuit, and so forth.

What is claimed is:

1. A magneto-optic display comprising a layer of composition comprising a ferrofluid and metal flakes said layer of composition sandwiched between two magnetic field permeable substrates, one of said substrates being optically transparent and the other of said substrates having at least one selectively energizable electro-magnet affixed thereto.

2. The display of claim 1 wherein the other of said substrates has an array of selectively energizable electromagnets affixed thereto.

3. The display of claim 1 wherein said composition further includes a diluent.

4. The display of claim 3 wherein said composition comprises by weight from about 80% to about 98.5% diluent, from about 0.5% to about 8.5% ferrofluid, and from about 1% to about 16% metal flakes.

5. The display of claim 4 wherein said electromagnet can provide a magnetic field of at least about 0.5 gauss.

6. The display of claim 5 wherein said magnetic field is from about 0.5 gauss to about 300 gauss.

7. The display of claim 3 wherein said diluent comprises water and said ferrofluid comprises magnetic particles colloidally dispersed in an aqueous carrier liquid.

8. The display of claim 7 wherein said composition comprises by weight about 10% ferrofluid and about 10% metal flakes.

9. The display of claim 3 wherein said diluent comprises a hydrocarbon liquid and said ferrofluid comprises magnetic particles colloidally dispersed in a hydrocarbon carrier liquid.

10. The display of claim 9 wherein said composition comprises about one part ferrofluid, one part metal flakes and from about 10 to about 50 parts diluent.

11. The display of claim 9 wherein said composition comprises about one part ferrofluid, two parts metal flakes and from about 40 to about 200 parts diluent.

12. The display of claim 9 wherein said composition comprises about one part ferrofluid, about four parts metal flakes and from about 40 to about 200 parts diluent.

* * * * *